United States Patent
Buchholz et al.

(10) Patent No.: US 6,389,826 B2
(45) Date of Patent: May 21, 2002

(54) HIGH CAPACITY AIR CONDITIONING SYSTEM WITH REDUNDANT STAGED RECIRCULATION AIR MIXING FOR AN AIRCRAFT

(75) Inventors: Uwe Albert Buchholz, Bliedersdorf; Thomas Scherer, Hamburg, both of (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 09/802,488

(22) Filed: Mar. 8, 2001

(30) Foreign Application Priority Data

Mar. 8, 2000 (DE) .......................... 100 11 238

(51) Int. Cl.⁷ ........................... F28B 9/00; F25D 21/00; B64D 13/02; B64D 13/00; F24F 3/00
(52) U.S. Cl. ...................... 62/172; 165/205; 165/235; 454/71; 454/76; 62/150; 244/129.2; 55/448
(58) Field of Search ................... 62/179, 186, 150, 62/172; 454/76, 74, 71; 165/205, 235; 55/448; 244/129.2

(56) References Cited

U.S. PATENT DOCUMENTS

| 4,445,342 | A | | 5/1984 | Warner | |
|---|---|---|---|---|---|
| 4,517,813 | A | * | 5/1985 | Eggebrecht et al. | .......... 55/448 |
| 5,386,952 | A | | 2/1995 | Nordström et al. | |
| 5,479,983 | A | * | 1/1996 | Fischer et al. | .............. 165/205 |
| 5,516,330 | A | * | 5/1996 | Dechow et al. | ............. 165/235 |
| 5,545,084 | A | * | 8/1996 | Fischer et al. | ................ 454/76 |
| 5,553,461 | A | * | 9/1996 | Hitzigrath et al. | ............. 62/150 |
| 5,695,396 | A | * | 12/1997 | Markwart et al. | ............. 454/71 |
| 5,791,982 | A | * | 8/1998 | Curry et al. | ............. 244/118.5 |
| 5,890,957 | A | * | 4/1999 | Scherer et al. | ................. 454/76 |
| 5,934,083 | A | * | 8/1999 | Scherer et al. | ................. 62/172 |
| 6,306,032 | B1 | * | 10/2001 | Scheffler et al. | .......... 244/129.2 |

FOREIGN PATENT DOCUMENTS

| DE | 3330556 | 3/1984 |
|---|---|---|
| DE | 4335152 | 4/1995 |
| DE | 4425871 | 2/1996 |
| DE | 19509773 | 6/1996 |
| DE | 19707858 | 7/1998 |

* cited by examiner

Primary Examiner—William Doerrler
Assistant Examiner—Filip Zec
(74) Attorney, Agent, or Firm—W. F. Fasse; W. G. Fasse

(57) ABSTRACT

In an air conditioning system for an aircraft, two pre-mixing units respectively mix cold air from two air conditioning units with recirculated fuselage interior air from two recirculation units, to prepare two pre-mixed air flows that are both directed into and mixed together in a common air distribution mixing chamber, from which mixed air distribution lines branch off to respectively associated separate air conditioning zones within the fuselage. Post-mixing units are respectively interposed in the mixed air distribution lines and respectively mix additional quantities of recirculated fuselage interior air into the mixed air distribution lines. Thereby, the admixture of recirculated air is divided into at least two stages, the system provides redundant failure tolerant operation, and the danger of ice formation in the air lines is reliably prevented even while the air conditioning units provide cold air at a temperature below the water freezing point.

25 Claims, 1 Drawing Sheet

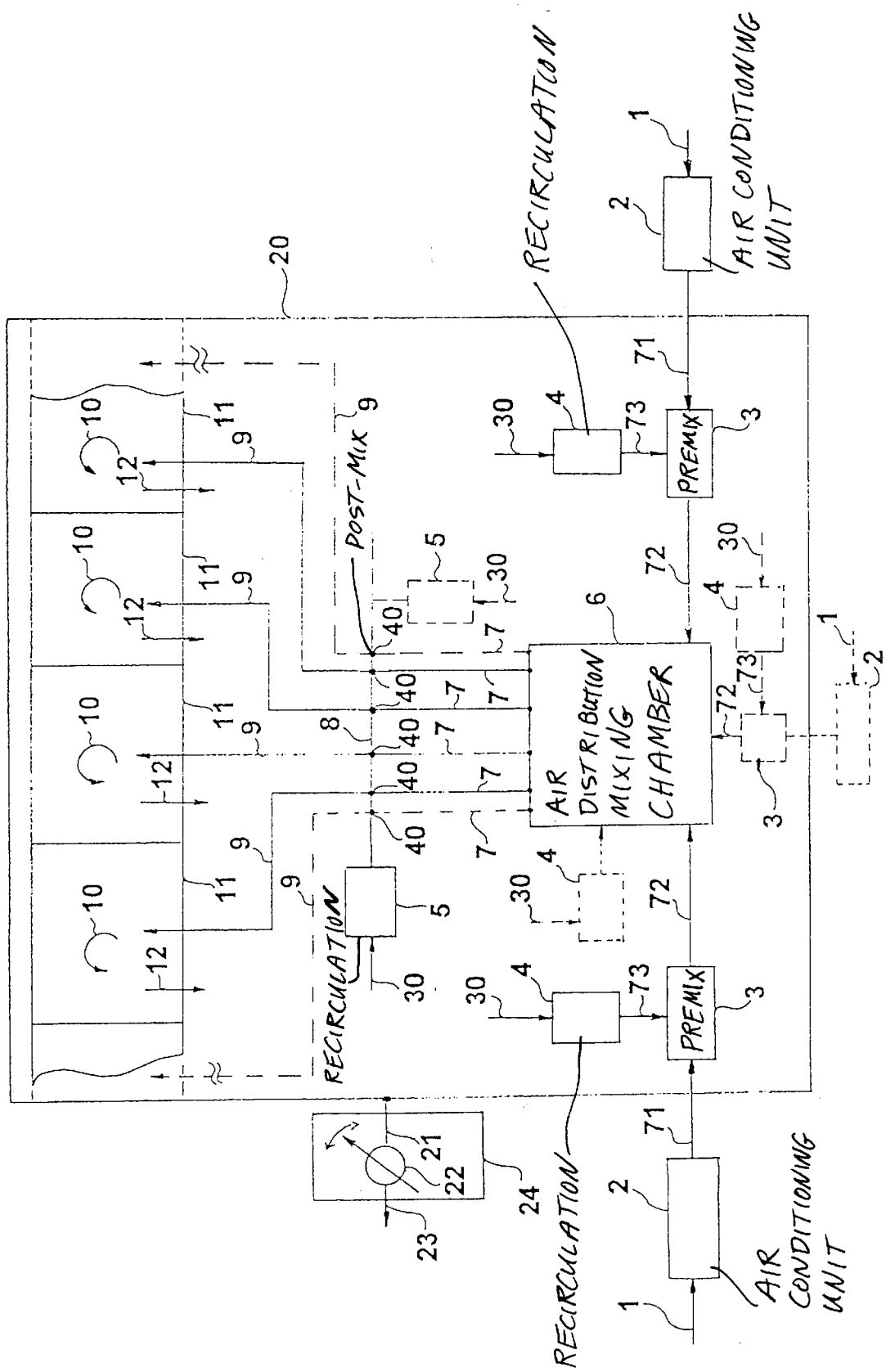

HIGH CAPACITY AIR CONDITIONING SYSTEM WITH REDUNDANT STAGED RECIRCULATION AIR MIXING FOR AN AIRCRAFT

PRIORITY CLAIM

This application is based on and claims the priority under 35 U.S.C. §119 of German Patent Application 100 11 238.2, filed on Mar. 8, 2000, the entire disclosure of which is incorporated herein by reference.

FIELD OF THE INVENTION

The invention relates to a high capacity air conditioning system especially for a passenger transport aircraft, having a redundant and multi-staged admixing of recirculation air to serve several air conditioning zones within the aircraft while achieving a redundant fault tolerant protection against air duct icing in the air conditioning system during operation.

BACKGROUND INFORMATION

It is generally known to provide air conditioning for the passenger cabin spaces in commercial passenger transport aircraft. To achieve this, highly compressed engine bleed air is tapped from the engines, and supplied into one or more air conditioning units (e.g. so-called air conditioning packs) where the high pressure air is expanded to an appropriate pressure for introduction into the pressurized aircraft fuselage and also cooled to a lower temperature. Then, the cooled air with an appropriate pressure is delivered through an air duct network into the several passenger cabin air conditioning zones.

Due to the large thermal load of the passengers, lighting, etc. within the passenger cabin air conditioning zones, it is generally necessary to cool the incoming supplied air very considerably in the air conditioning units to provide a sufficient cooling capacity. Thereby, the air temperature very often reaches low temperatures far below the freezing point of water. The external atmospheric fresh air, which is supplied into the air conditioning system in the form of engine bleed air, has a sufficiently high moisture content, especially at lower altitudes in the atmosphere, so that this moisture will be condensed out of the air and frozen in the form of ice, frost or snow, when the air is cooled to very cold temperatures in the air conditioning unit.

For this reason, it is necessary to protect the air duct system connected downstream of the respective air conditioning unit from the danger of such snow, frost and ice accumulating therein, i.e. by preventing the ice-forming conditions. This is important, because accumulations of such ice can ultimately lead to a partial or complete blockage of the air flow through the affected air duct, or can lead to the formation of loose snow and ice deposits that travel through the duct system with the air flowing therethrough until they reach a warmer location and melt, thereby causing uncontrollable liquid puddling and/or leaks. In either case, and especially if a duct blockage reduces or totally stops the supply of fresh air to the passenger cabin air conditioning zones, this will lead to discomfort or health risks for the passengers.

For the above reasons, it is generally required in the field to avoid the danger of ice formation in air conditioning systems in aircraft, by various conceptual solutions to this problem. Various conventionally known solutions will now be discussed. A first conceptual starting point for a solution is to avoid reducing the temperature of the air conditioning air below the freezing point of water, i.e. to maintain the output air of the air conditioning packs above the freezing point. In that case, however, in order to provide the required total cooling capacity or energy, it is necessary to provide a correspondingly increased mass flow of the cooled air, which requires tapping more energy-rich bleed air from the engines.

Moreover, in order to achieve comfortable passenger air conditioning zone inlet temperatures and sufficiently high ventilation properties, it is typical to mix recirculated passenger cabin air (or generally fuselage interior air) with a corresponding quantity of the cooled air. Such a measure is generally known as "air recirculation". Such a solution is realized in the Airbus A300–600 and A310 aircraft, which, however, consumes an undesirably high quantity of engine bleed air for cooling the passenger air conditioning zones, since the degree of cooling of the air in the air conditioning units is limited to remain above the freezing point. Thus, the fuel consumption of the engines is undesirably increased.

The Boeing B747 aircraft also realizes or embodies the above discussed solution. In that aircraft, however, the air conditioning system attempts to raise the temperature of the cooling air by mixing cold air and recirculation air in a first recirculation stage following a distribution manifold. This measure is carried out with reference to each air conditioning zone. The desired ventilation and comfort properties are achieved by addition of further recirculation air in a second stage. Splitting or separating the recirculation into stages in this manner allows a reduction of the air duct cross-sectional sizes and the associated weight of the air ducts between the stages. However, the danger of ice accumulation with the associated danger of air duct blockage is not completely avoided, because the first air mixing stage is only provided downstream of the air distribution stage. This is true for both normal operation as well as failure or fault mode operation.

In the event of a failure of one recirculation unit, the supply of air provided by the still-operable second recirculation unit cannot compensate for this failure of the other recirculation unit. Moreover, in this context, the air conditioning unit outlet temperature remains limited to above the freezing point, just as in the above discussed Airbus A300–600 and A310 aircraft. In order to compensate for the loss of cooling energy, the only solution is to increase the mass flow of energy-rich engine bleed air, which leads to an increased fuel consumption.

Efforts have been made to avoid this above mentioned disadvantage in the Airbus A340 and A320 aircraft, in that the entire cooling and recirculation air is collected or pooled together in a common mixing unit. In that manner, a high failure redundancy is achieved to allow a fault tolerant or emergency operation in the event of cooling air and/or recirculation air supply failures.

In view of the above described conceptual basis, it is apparent that icing of the cooling air supply ducts within the pressurized fuselage will not be avoided, and complicated duct arrangements connecting to a mixing chamber as well as additional flow-influencing components will be necessary, in order to optimally configure and embody the mixing process. Moreover, a residual danger of icing in areas of air flow separation still remains and cannot be completely excluded. A further disadvantage is that rather large dimensions of the air duct cross-sections and a rather high weight of the air duct system are unavoidable, in comparison to the arrangement of the Boeing B747, in order to provide the entire required air conditioning air quantity for achieving the required ventilation and comfort characteristics, in a central mixing chamber and then to supply and distribute this air from the common central mixing chamber to the several separate zones.

As a further development, the Boeing B777 aircraft to some extent realizes a combination of the systems of the Boeing B747 and the Airbus A340/A320 aircraft. Namely, the Boeing B777 aircraft uses a central mixing chamber, to which are allocated a first cool air supply with a constant recirculation air admixing and a second cool air supply without a constant recirculation air admixing. To complete the air flow in order to achieve corresponding required ventilation and comfort properties, a further constant recirculation air quantity is locally admixed into the previously mixed air described above. However, the second cool air supply without the recirculation air admixing suffers the above mentioned disadvantages of duct icing, or more directly the resultant temperature limitations of the air and the associated cooling energy losses that are necessary for avoiding duct icing. Also in the event of a failure of the recirculation air admixing into the cooling air supply, both cooling air supply air temperatures must be maintained above the water freezing point, which thus represents a considerable loss of cooling energy capacity.

Furthermore, U.S. Pat. No. 4,517,813 discloses an air conditioning system with a so-called air-mix water-separator manifold, into which appropriately tempered air quantities are supplied from two sides, whereby this supplied air is formed from partial air quantities of warm recirculated cabin air, that has been combined with cool air quantities provided from an air cycle machine (ACM). The outlets of this branching or distribution manifold are respectively connected to various fuselage areas of a passenger aircraft, for example the cockpit or flight deck, a forward passenger cabin or zone, and an aft passenger cabin or zone. This manifold serves to mix the air quantities that are supplied into the manifold, while simultaneously separating any water or moisture out of the humid supply air, presumably also in order to avoid ice formation or ice accumulation or the transformation of air moisture into snow crystals. However, it appears that such a protection against icing in the air ducts only relates to a single stage (and not a multi-stage) recirculation air admixture, and does not provide any protection against blockages of downstream connected air ducts of multiply branched ducts or air lines of a complex high capacity air conditioning system. Particularly, no suggestions and no motivations toward the present invention of the present application would have been provided by the above-mentioned U.S. Patent.

SUMMARY OF THE INVENTION

In view of the above it is an object of the invention to provide an air conditioning system for a passenger aircraft, which achieves a fault or failure tolerant redundant operation and protection against icing of air ducts through a trimmed admixture of recirculation air in connection with the operation of a high capacity cooling system, with a minimum cold air mass flow consumption and maximum total air quantity provision for the passenger cabin air conditioning zones, in order to achieve the prescribed ventilation and passenger comfort properties. The invention further aims to avoid or overcome the disadvantages of the prior art, and to achieve additional advantages, as apparent from the present specification.

The above objects have been achieved according to the invention in an air conditioning system with a redundant multi-stage admixture of recirculation air for a passenger aircraft, in which several air conditioning zones are to be respectively air conditioned. Throughout this specification, the term "zone" or "air conditioning zone" refers to a respective temperature zone or respective passenger cabin zone (e.g. a first class cabin zone versus an economy cabin zone), which are to be separately or individually supplied with air conditioning air, for example having different temperatures, different air flow rates, different ratios of fresh air relative to recirculation air, or the like. Further, throughout this specification, the term "air line" and the term "air duct" are each intended to cover any type of passage for conveying an air flow therethrough, including ducts, pipes, hoses, air shafts, channels, and the like.

The air conditioning system according to the invention comprises at least two air conditioning units which respectively receive high pressure air that contains water vapor, and which respectively expand and cool the supplied air to temperatures below the freezing point of water. The air conditioning system further includes at least two pre-mixing units arranged in the aircraft fuselage, whereby a respective individual pre-mixing unit is directly individually connected downstream to each one of the air conditioning units. A respective recirculation unit is further connected to each pre-mixing unit to supply a recirculation air flow of recirculated cabin air (or generally fuselage interior air) into the pre-mixing unit. The quantity of recirculation air provided by each respective recirculation unit to the connected pre-mixing unit is variable and controllable to provide the proper mixture of recirculation air and air conditioning pack air.

The at least two pre-mixing units are each connected in turn at the outlet or downstream side to an air distribution mixing chamber, which collects and pools together the various flows of pre-mixed air that it receives, and provides respective portions of this collected pre-mixed air to several respective air distribution outlets that are respectively in turn each individually connected to an after-mixing or post-mixing unit, to which further a recirculation supply line from at least one local recirculation unit is connected. Thereby, an additional variable controllable quantity of recirculation air drawn from fuselage interior spaces is respectively admixed into the air provided from the air distribution mixing chamber, separately for each respective air conditioning zone, i.e. with a separately adjustable or variable admixing ratio for each individual air conditioning zone. The respective total mixed air provided by each post-mixing unit respectively, is then supplied into the respective associated air conditioning zone.

With the above arrangement, the present inventive air conditioning system allows the air conditioning pack air provided at the outlets of the air conditioning units to be cooled to low temperatures below the freezing point of water, so as to achieve a high cooling capacity, while nonetheless preventing the formation of ice, frost or snow in the air conditioning system, due to the admixing of recirculated fuselage interior air in respective pre-mixing units connected directly downstream to the outlets of the air conditioning units. The pre-mixing units preferably mix just enough recirculation air into the incoming cold air to raise the temperature above the freezing point of water, e.g. to achieve a temperature not more than 1° C. above the freezing point. Thereby, icing conditions are reliably prevented throughout the air conditioning system, while maintaining the highest possible cooling capacity, smallest possible duct and mixing chamber sizes upstream of the final post-mixing units, and the highest degree of flexibility or adjustment leeway for the final post-mixing units to achieve the final air characteristics (e.g. temperature, flow rate, fresh air proportion, etc.) required for a particular air conditioning zone.

Furthermore, the present inventive air conditioning system provides redundancy and thus fault tolerant operation, by collecting and pooling together the pre-mixed air flow from at least two pre-mixing units respectively cooperating with at least two air conditioning units, while distributing the pre-mixed air as required to all of the separate air conditioning zones. Thus, in the event of the failure of one of the pre-mixing units and/or one of the air conditioning units, the remaining available air conditioning unit and pre-mixing unit will still provide pre-mixed air into the air distribution mixing chamber, which in turn will distribute the air to all of the necessary individual air conditioning zones. In such a fault tolerant or emergency operating mode, the maximum available total cooling capacity will be less than the maximum full capacity achieved when all air conditioning units are operating, but cooling air will still be supplied to all necessary air conditioning zones, and the outlet temperature of one or more remaining operational air conditioning units can be reduced to help compensate for the loss of maximum air conditioning capacity, while still avoiding the dangers of ice formation.

As another advantage, the present inventive air conditioning system achieves an individualized control and mixing ratio of recirculated fuselage interior air for each respective individual air conditioning zone, despite the common pooling of the supply air in the air distribution mixing chamber. This is achieved by the post-mixing units that are individually interposed in the separate air supply lines connecting the air distribution mixing chamber to the several respective air conditioning zones. Thus, different zones can have different ratios of recirculated air, different temperatures, or the like.

All of the above advantages are achieved together and simultaneously in a unified air conditioning system according to the invention.

BRIEF DESCRIPTION OF THE DRAWINGS

In order that the invention may be clearly understood, it will now be described in connection with an example embodiment, with reference to the accompanying single drawing Figure, which shows a schematic block circuit diagram of a high capacity air conditioning system with redundant multistage recirculation air admixture according to the invention.

DETAILED DESCRIPTION OF PREFERRED EXAMPLE EMBODIMENTS AND OF THE BEST MODE OF THE INVENTION

Developing further from the above described conventional considerations or solutions for addressing the problem of icing in air ducts or air lines of air conditioning systems in aircraft, the present invention is based on the consideration that the icing prevention for the air lines of the air conditioning system must be provided directly downstream of the air outlet of each air conditioning unit, or particularly immediately after or down-stream of the point at which each cooling air supply line penetrates into the pressurized fuselage of the aircraft. Namely, the invention provides an initial or preliminary pre-mixing of warm recirculated fuselage interior air with the cold air provided by the respective air conditioning unit in order to reliably prevent ice formation in all air conditioning system components and particularly all air lines downstream of the initial pre-mixing unit, at all possible temperatures of the cooling air provided at the outlet of the respective air conditioning unit.

At this initial pre-mixing stage, the quantity of recirculated fuselage interior air is variably controlled and limited to the minimum recirculation air quantity required for avoiding icing conditions in the air lines. Thereafter, a respective additional variable quantity of recirculated air is admixed into the air flow, as separately required for each individual air conditioning zone, so as to provide the respectively required total air flow characteristics for the respective zones to achieve the prescribed ventilation and comfort properties (e.g. the air flow velocity and the temperature distribution) in the respective air conditioning zones.

The single drawing Figure schematically shows a representative block circuit diagram of the basic construction of a high capacity air conditioning system according to the invention. At least two air conditioning units 2 are arranged outside of the pressurized fuselage 20 of the aircraft, and are each respectively provided with highly compressed air from a respective high pressure air supply 1, such as engine bleed air from compressor stages of the main aircraft engines, or an auxiliary power unit (APU) engine, or ground-based high pressure air sources. The air conditioning units 2 expand and cool the high pressure air to a pressure level that is suitable or appropriate for introducing into the pressurized fuselage 20, and a temperature level that is sufficiently cold, and particularly below the freezing point of water, to achieve the required total cooling capacity.

The resulting cold air (at below-freezing temperature) provided by the air conditioning units 2 is supplied through respective cold air supply lines 71 into the pressurized fuselage 20 and particularly into respective pre-mixing units 3 that are individually connected by the lines 71 to the individual air conditioning units 2. Each one of these pre-mixing units 3 respectively comprises a junction of air lines or air ducts, or a spiral housing of a respective turbomachine with or without an air injector nozzle, which has the effect and function of mixing together the air flows supplied into the respective pre-mixing unit 3.

A respective recirculation unit 4, which comprises a ventilator, fan or blower, as well as a one-way valve and an air cleaning element such as an air filter, is connected by a respective recirculation air line 73 to each respective one of the pre-mixing units 3. Thereby, the recirculation units 4 supply fuselage interior air 30, e.g. used passenger cabin air that is exhausted from the passenger cabin or air from other fuselage interior spaces, into the pre-mixing units 3, where this recirculated fuselage interior air 30 is mixed with the cold air supplied by the air conditioning units 2. The fuselage interior air 30 may be drawn from a recirculation air duct or the like leading from the passenger cabin exhaust outlets, or may be drawn from an open interior space or spaces within the fuselage in communication with the cabin exhaust air. Generally, recirculation air ducts or the like are considered as being included in the term "fuselage interior space".

The quantity of recirculated fuselage interior air 30 supplied by the recirculation units 4 is variable and is adjusted as necessary to raise the temperature of the resulting pre-mixed air output by the pre-mixing units 3 to above the freezing point of water. Particularly, the minimum possible quantity of recirculated fuselage interior air 30 is provided to the pre-mixing units 3 to achieve the desired temperature level (e.g. 1° C. above the freezing point) for reliably avoiding icing conditions within any of the remaining air lines and components connected downstream of the pre-mixing units 3. Thereby, in operation, variable pre-mixed air quantities will be output by the respective pre-mixing units 3.

To achieve the fault tolerance and redundancy of the present inventive system as described herein, the system includes at least two air conditioning units 2, and at least two separate pre-mixing units 3 that are respectively individually connected to the air conditioning units 2 directly downstream thereof. As indicated by dashed lines in the single drawing Figure, a third air conditioning unit 2 may be provided, and is connected to a third pre-mixing unit 3, which also receives recirculated fuselage interior air 30 from a third recirculation unit 4.

In any event, the pre-mixed air from all of the pre-mixing units 3 is provided through respective pre-mixed air supply lines 72 into a common air distribution mixing chamber 6, in which all of the separate flows of pre-mixed supply air are further mixed and pooled together in a common plenum chamber space, with or without additional air mixing or air directing components therein. Also, as shown by dashed lines in the drawing Figure, an additional quantity of recirculated fuselage interior air 30 can be supplied by another recirculation unit 4 directly into the air distribution mixing chamber 6, to be mixed and pooled together with the pre-mixed air therein. The pre-mixed air supply lines 72 may be individually connected to respective separate inlets of the air distribution mixing chamber 6, or may be joined together before being connected to a single common inlet of the mixing chamber 6. Either of these alternatives is considered an equivalent of the other, and both are covered by any disclosure relating to separate inlets of the mixing chamber 6. A similar consideration applies to the outlet or outlets of the mixing chamber 6 leading into plural mixed air distribution lines 7.

A plurality of individual mixed air distribution lines 7 are branched off from the air distribution mixing chamber 6, and are respectively individually allocated to associated individual air conditioning zones 11 within the pressurized fuselage 20. For example, the individual air conditioning zones 11 may include a cockpit or flight deck zone, at least one first class cabin zone, at least one economy cabin zone, and/or at least one freight compartment zone, or the like. These separate zones are to be individually controlled to different temperatures and/or provided with different ratios of recirculated air relative to fresh air. Therefore, each zone requires a separate individualized supply of air conditioning air, which it receives from the respective individual mixed air distribution line 7 associated therewith.

Respective individual local post-mixing units 40 are individually connected downstream to the several respective mixed air distribution lines 7. A local recirculation unit 5 is connected by a recirculation air supply line 8 to each one of the post-mixing units 40, so as to supply a respective controlled adjustable quantity of recirculated fuselage interior air 30 individually to each one of the post-mixing units 40. To achieve this, each post-mixing unit may include a variable air flow control device such as an air valve of any known type, or a spiral housing preferably with a variable adjustable air injection nozzle therein. A second local recirculation air unit 5 may be additionally connected to the recirculation air supply line 8, to provide an additional or redundant supply of recirculated fuselage interior air 30, as shown by dashed lines in the Figure.

Particularly, depending on the needs of each respective individual air conditioning zone 11, a different variable adjusted quantity of the recirculated interior fuselage air 30 is admixed with the mixed air provided from the air distribution mixing chamber 6 through the respective mixed air distribution line 7 into the respective individual post-mixing unit 40. This is carried out so as to prepare a respective zone-specific total air flow quantity that is provided through a respective zone air supply line 9 leading from the respective post-mixing unit 40 into the respective associated air conditioning zone 11. Thus, the post-mixing unit 40 respectively associated with a particular air-conditioning zone 11, i.e. connected to this air conditioning zone 11 by the respective zone air supply line 9, will admix the appropriate quantity of recirculated fuselage interior air 30 provided by the local recirculation unit 5, to achieve the proper temperature and the proper recirculation air ratio in the total zone supply air that is supplied through the zone air supply line 9 into the respective zone 11.

There, the air is blown into the respective zone 11 so as to generate a defined cabin air flow or flow pattern 10 within the air conditioning zone 11. The air of this zone air flow 10 passes through the respective zone 11, and after traversing through and thereby dwelling in the respective zone 11 for a certain time, the used cabin air is exhausted out of the respective cabin zone 11 through a respective associated cabin zone exhaust opening into an exhaust air duct or into a space within the pressurized fuselage 20. A portion of this air becomes the above mentioned fuselage interior air 30 that is recirculated, another portion of this air becomes exhaust air that is exhausted overboard into the outside environment 23 around the outside of the aircraft fuselage 20.

In this regard, the exhausting or venting of used fuselage interior air overboard from the aircraft is carried out through a pressure regulating system 24, which includes a fuselage pressure regulating valve 22 and an exhaust air line 21 connecting from the fuselage interior space to this pressure regulating valve 22. Thereby, the air that is to be exhausted from the fuselage interior space passes through the exhaust air line 21 and then through the pressure regulating valve 22, which determines the pressure established within the pressurized fuselage 20, by the throttling and pressure regulating effect of this valve 22.

According to further detailed features of the invention, each air conditioning unit 2 is operable in a regulatable manner with regard to the air quantity and the air temperature that is to be supplied by this air conditioning unit 2, in any generally known manner using any generally known components. Similarly, the recirculation units 4 and 5 are variable and regulatable as to the air quantity to be recirculated thereby. As a further feature or alternative, the inlets of the mixing units connected to the recirculation units may be equipped with air regulating valves, gates, flap doors or the like. These features can be achieved by any known mechanisms and methods.

As mentioned above, the inventive air conditioning system has a redundant operation property to provide a failure safety mode. Namely, the air-conditioning system includes at least two independent air conditioning units 2, which are respectively individually connected at the outlets thereof to two pre-mixing units 3. A respective recirculation unit 4 is individually connected to each respective one of the pre-mixing units 3.

In the event of a failure of one of the air conditioning units 2, the respective pre-mixing unit 3 connected thereto will not receive cold air from the air conditioning unit 2 that failed, but will further be supplied with recirculated fuselage interior air 30. In order to compensate for the reduction of the cooling energy, i.e. since the failed air conditioning unit 2 is no longer providing its share of the total cooling energy required, the other functioning air conditioning unit 2 is adjusted to provide cold output air at a much lower air temperature, in order to still provide the total required cooling energy (to the extent possible, i.e. to the maximum capacity limit of the operating air conditioning unit 2). Simultaneously, the pre-mixing unit 3 connected to the operating air conditioning unit 2 is adjusted to the extent necessary, to provide the required icing protective function, i.e. to mix a sufficient quantity of recirculated fuselage interior air 30 into the cold air flow to prevent icing, even though the cold air is now being provided at a significantly lower temperature.

On the other hand, if one of the recirculation units 4 fails, then the air conditioning unit 2 connected thereto is simply regulated to provide cold air at a temperature above the freezing point of water, so as to avoid any danger of freezing. Simultaneously, the output temperature of the cold air supplied by the other air conditioning unit or units 2 is slightly reduced, to compensate for the reduction of the cooling energy supplied by the air conditioning unit 2 connected to the failed recirculation unit 4. Meanwhile, the recirculation unit or units 4, that are connected to the other air conditioning unit or units 2 (which are now providing cold air at a lower temperature), are regulated to provide a higher flow of recirculation air in order to reliably prevent any icing danger in or downstream from the respective associated pre-mixing unit 3.

In any event, these different regulated air flows are all provided to the common air distribution mixing chamber 6, where the temperature and composition of the air is thoroughly mixed and made uniform, before being distributed to the several separate air conditioning zones 11 as described above. Furthermore, it is also important that the individual local post-mixing units 40 then are individually regulated to prepare the zone supply air having the appropriate temperature, recirculation ratio, and air flow quantity for the respective associated zone 11.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. In a passenger aircraft including a pressurized fuselage having fuselage interior air therein, at least one source of high pressure air, an air conditioning system connected to said at least one source so as to receive high pressure air therefrom, plural air conditioning zones in said fuselage connected to said air conditioning system to receive air conditioning air therefrom, and a pressure relief device arranged and adapted to exhaust some of said fuselage interior air out of said fuselage, an improvement in said air conditioning system comprising:

first air conditioning means connected to at least one of said at least one source of high pressure air for receiving, cooling and expanding said high pressure air to provide first cold air having a first cold air temperature below a freezing point of water;

second air conditioning means connected to at least one of said at least one source of high pressure air for receiving, cooling and expanding said high pressure air to provide second cold air having a second cold air temperature below a freezing point of water;

first recirculation means for receiving some of said fuselage interior air and providing therefrom first recirculation air;

second recirculation means for receiving some of said fuselage interior air and providing therefrom second recirculation air;

first pre-mixing means for receiving and mixing together said first cold air and said first recirculation air to provide first pre-mixed air having a first pre-mixed air temperature above a freezing point of water;

second pre-mixing means for receiving and mixing together said second cold air and said second recirculation air to provide second pre-mixed air having a second pre-mixed air temperature above a freezing point of water;

air distribution mixing means for receiving and mixing together said first pre-mixed air and said second pre-mixed air to provide common pooled air;

local recirculation means for receiving some of said fuselage interior air and providing therefrom local recirculation air;

first local post-mixing means for receiving and mixing together some of said common pooled air and at least some of said local recirculation air, and providing therefrom first zone supply air into a first one of said air conditioning zones; and second local post-mixing means for receiving and mixing together some of said common pooled air and at least some of said local recirculation air, and providing therefrom second zone supply air into a second one of said air conditioning zones.

2. In a passenger aircraft including a pressurized fuselage, at least one source of high pressure air, an air conditioning system connected to said at least one source so as to receive high pressure air therefrom, plural air conditioning zones in said fuselage connected to said air conditioning system to receive air conditioning air therefrom, and a pressure relief device adapted to exhaust some of said fuselage interior air out of said fuselage, an improvement in said air conditioning system comprising:

first and second air conditioning units that each respectively have a respective high pressure air inlet connected to said at least one source so as to receive high pressure air therefrom, and a respective cold air outlet at which said air conditioning units are respectively adapted to provide cold air having a temperature below a freezing point of water;

first and second pre-mixing units that are arranged inside said fuselage, and that each respectively have a respective cold air inlet connected respectively individually to a respective one of said cold air outlets of said first and second air conditioning units, a respective recirculation air inlet, and a respective pre-mixed air outlet providing pre-mixed air having a temperature above a freezing point of water;

first and second recirculation units that are arranged inside said fuselage and that each respectively have a respective fuselage interior air inlet which communicates with and receives a portion of said fuselage interior air, and a respective recirculation air outlet connected respectively individually to a respective one of said recirculation air inlets of said first and second pre-mixing units;

an air distribution mixing chamber connected in common to said pre-mixed air outlets of said first and second pre-mixing units, and having first and second common pooled air outlets;

at least one local recirculation unit that is arranged in said fuselage and has an inlet which communicates with and receives a portion of said fuselage interior air and provides therefrom local recirculation air; and first and second local post-mixing units that are arranged inside said fuselage and that each respectively have a respective common pooled air inlet connected respectively individually to a respective one of said common pooled air outlets of said air distribution mixing chamber, a respective local recirculation air inlet connected to at least one of said at least one local recirculation unit, and a respective final mixed air zone supply outlet connected respectively individually into a respective one of said first and second zones of said plural air conditioning zones.

3. In a passenger aircraft including a pressurized fuselage enclosing a fuselage interior space with at least first and second air conditioning zones therein, at least one source of high pressure air, and an air conditioning system that is connected to said at least one source so as to receive high pressure air therefrom and that is connected to said first and second air conditioning zones so as to provide air conditioning air thereto, an improvement in said air conditioning system comprising:
a first air conditioning unit having an air inlet connected to said at least one source of high pressure air and having a cold air outlet;
a second air conditioning unit having an air inlet connected to said at least one source of high pressure air and having a cold air outlet;
a first recirculation unit having an air inlet communicating with said fuselage interior space and having an air outlet;
a second recirculation unit having an air inlet to communicating with said fuselage interior space and having an air outlet;
a first pre-mixing unit having a cold air inlet connected to said cold air outlet of said first air conditioning unit, another air inlet connected to said air outlet of said first recirculation unit, and an air outlet communicating with both of said air inlets of said first pre-mixing unit;
a second pre-mixing unit having a cold air inlet connected to said cold air outlet of said second air conditioning unit, another air inlet connected to said air outlet of said second recirculation unit, and an air outlet communicating with both of said air inlets of said second pre-mixing unit;
an air distribution mixing chamber having a first air inlet connected to said air outlet of said first pre-mixing unit, a second air inlet connected to said air outlet of said second pre-mixing unit, and first and second air outlets that each communicate with both of said first and second air inlets of said air distribution mixing chamber;
at least one local recirculation unit having at least one air inlet communicating with said fuselage interior space and having at least one air outlet;
a first local post-mixing unit having an air inlet connected to said first air outlet of said air distribution mixing chamber, another air inlet connected to at least one said air outlet of said at least one local recirculation unit, and an air outlet that communicates with both of said air inlets of said first local post-mixing unit and that is connected to said first air conditioning zone; and
a second local post-mixing unit having an air inlet connected to said second air outlet of said air distribution mixing chamber, another air inlet connected to at least one said air outlet of said at least one local recirculation unit, and an air outlet that communicates with both of said air inlets of said second local post-mixing unit and that is connected to said second air conditioning zone.

4. The improvement in said air conditioning system according to claim 3, wherein said first and second air conditioning zones respectively have different temperatures, different air flow rates, or different proportional ratios of fresh outside air and recirculated air in said air conditioning air, and wherein said first and second local post-mixing units each respectively include a variable air flow control device that variably controls a mixing ratio of recirculated air provided by said at least one local recirculation unit relative to common pooled pre-mixed air provided by said air distribution mixing chamber.

5. The improvement in said air conditioning system according to claim 3, wherein said first and second air conditioning units are each respectively adapted and controlled to provide respective cold air having a temperature below a freezing point of water at said cold air outlets thereof, and wherein said first and second pre-mixing units and said first and second recirculation units are adapted and controlled to provide a respective variable pre-mixing ratio of said cold air and recirculation air from said fuselage interior space respectively in each of said first and second pre-mixing units so as to provide respective pre-mixed air having a temperature above a freezing point of water respectively at said air outlets of said first and second pre-mixing units.

6. The improvement in said air conditioning system according to claim 5, wherein said first and second pre-mixing units and said first and second recirculation units are adapted and controlled variably so that said temperature of said respective pre-mixed air is not more than 1° C. above the freezing point of water.

7. The improvement in said air conditioning system according to claim 3, wherein said cold air inlets of said first and second pre-mixing units are respectively connected directly to said cold air outlets of said first and second air conditioning units by respective air lines with no other devices and no other air handling units interposed therebetween.

8. The improvement in said air conditioning system according to claim 7, wherein said first and second air conditioning units are respectively arranged outside of said pressurized fuselage, and said first and second pre-mixing units are respectively arranged immediately inside said pressurized fuselage.

9. The improvement in said air conditioning system according to claim 3, further comprising another recirculation unit having an air inlet communicating with said fuselage interior space and an air outlet connected and communicating directly into said air distribution mixing chamber.

10. The improvement in said air conditioning system according to claim 3, wherein said at least one local recirculation unit comprises one recirculation unit that is connected to both said first and second local post-mixing units by a common local recirculation supply line interconnected therebetween.

11. The improvement in said air conditioning system according to claim 3, wherein said aircraft further includes cabin divider walls respectively enclosing and separating said air conditioning zones from each other, wherein said divider walls have exhaust openings therein which communicate from said air conditioning zones directly or indirectly to a remainder of said fuselage interior space with which said air inlets of said recirculation units are in communication.

12. The improvement in said air conditioning system according to claim 3, further comprising a pressure regulating exhaust valve arrangement communicating through said pressurized fuselage from said fuselage interior space to an external environment outside of said pressurized fuselage.

13. The improvement in said air conditioning system according to claim 3, wherein each one of said recirculation units respectively comprises an air cleaner element.

14. The improvement in said air conditioning system according to claim 13, wherein each one of said recirculation units respectively further comprises a speed-regulated blower and a one-way non-return air valve.

15. The improvement in said air conditioning system according to claim 3, wherein each one of said pre-mixing units comprises an assembly of air duct junction components.

16. The improvement in said air conditioning system according to claim 3, wherein each one of said pre-mixing units comprises a turbo-machine spiral housing with an integrated air injector nozzle.

17. The improvement in said air conditioning system according to claim 3, wherein each one of said pre-mixing units comprises a turbo-machine spiral housing without an integrated air injector nozzle.

18. The improvement in said air conditioning system according to claim 3, wherein said air distribution mixing chamber comprises a housing enclosing a plenum chamber space therein and at least one air flow influencing device therein.

19. The improvement in said air conditioning system according to claim 3, wherein each one of said post-mixing units respectively comprises an assembly of air duct junction components.

20. The improvement in said air conditioning system according to claim 3, wherein each one of said post-mixing units comprises a turbo-machine spiral housing with an integrated air injector nozzle.

21. The improvement in said air conditioning system according to claim 3, wherein each one of said post-mixing units comprises a turbo-machine spiral housing without an integrated air injector nozzle.

22. The improvement in said air conditioning system according to claim 3, wherein each one of said air conditioning units respectively comprises an air cycle machine adapted to carry out a thermodynamic compression-expansion cycle with inter-cooling.

23. The improvement in said air conditioning system according to claim 22, wherein each one of said air conditioning units respectively further comprises a water separator.

24. The improvement in said air conditioning system according to claim 22, wherein each one of said air conditioning units respectively further comprises a speed regulated blower which regulates a quantity flow of cold air provided at said cold air outlet.

25. The improvement in said air conditioning system according to claim 22, wherein each one of said air conditioning units respectively further comprises a controllable air cooling element adapted to control a temperature of cold air provided at said cold air outlet.

* * * * *